United States Patent [19]

Moon et al.

[11] Patent Number: 4,519,153

[45] Date of Patent: May 28, 1985

[54] DISPLAY DEVICE

[76] Inventors: Joseph C. Moon, 127 Pinewood Dr.; Arthur T. Craig, Windsor Rd., both of Greer, S.C. 29651

[21] Appl. No.: 387,488

[22] Filed: Jun. 11, 1982

[51] Int. Cl.³ .............................................. G09F 21/04
[52] U.S. Cl. ................................... 40/591; 116/28 R; 116/173
[58] Field of Search ........................ 40/591, 590, 593; 116/28 R, 42, 173; 46/27, 28, 29, 30, 31, 25; 248/74.3

[56] References Cited

U.S. PATENT DOCUMENTS

| | | | |
|---|---|---|---|
| 2,398,748 | 4/1946 | Lange et al. | 116/28 R |
| 3,036,545 | 5/1962 | Legg | 116/28 R |
| 3,081,734 | 3/1963 | Spahl | 116/173 |
| 3,154,281 | 10/1964 | Frank | 248/74.3 |
| 4,015,557 | 4/1977 | Schulein | 40/591 |
| 4,129,975 | 12/1978 | Gabriel | 46/29 |
| 4,144,833 | 3/1979 | Newman, Sr. | 116/28 R |
| 4,158,925 | 6/1979 | Gagnon | 40/591 |
| 4,163,426 | 8/1979 | O'Neill | 40/591 |
| 4,348,978 | 9/1982 | Brocato | 40/591 |

*Primary Examiner*—Gene Mancene
*Assistant Examiner*—James Hakomaki

[57] ABSTRACT

A display device for use on automobiles and the like which includes a bracket having a vertical bore extending therethrough for supporting a staff upon which a flag is carried. The bracket is attached to an automobile and the staff can be readily removed from the bracket for waving the flag by hand.

2 Claims, 3 Drawing Figures

DISPLAY DEVICE

BACKGROUND OF THE INVENTION

Heretofore, flag displays used by fans at sporting events showing various school and athletic team emblems are normally hand held and are often secured in the window of automobiles while traveling to the event.

In order to maintain the flags in an open extended position so that the school emblem is clearly visible through an automobile window, the upper edges of the flag are wedged between the closed window and the window socket. This normally permits the flag to hang freely but, more often than not, the flag is not evenly spread across the window.

At sporting events, normally the same flag is hand held and waved like a handkerchief.

SUMMARY OF THE INVENTION

The display device constructed in accordance with the present invention provides an attractive and eye-catching display of a school flag or emblem while mounted on an automobile which also permits the same staff as used with the automobile mount to be held and waved at the sporting event.

The display device includes a bracket having an inverted "U" shaped portion adapted to be attached to the window of a vehicle. A staff extends into a substantially vertical bore provided in the bracket for holding the flag in a vertical position so that as the automobile is driven, the wind holds the flag in an extended open position.

The lower end of the staff is bifurcated so that the staff fits snugly within the bore preventing the wind from pulling the staff and flag thereout as the automobile is driven. However, it also permits the staff to be readily removed by merely pulling upwardly.

Accordingly, it is an important object of the present invention to provide a simple and attractive display device for flags and the like that can be either mounted on automobiles or held by hand.

Another important object of the present invention is to provide a flag display device that can be readily secured on automobiles without any permanent fixtures for displaying a flag as the automobile is driven down the highway.

DESCRIPTION OF A PREFERRED EMBODIMENT

Figure 1:
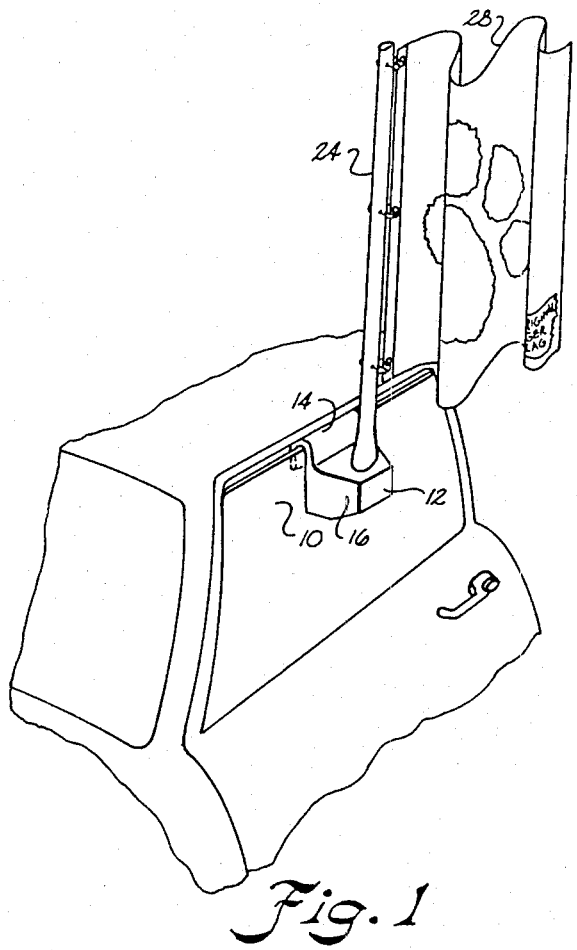
FIG. 1 is a perspective view of an automobile having a flag display device secured on the window thereof.
Figure 2:
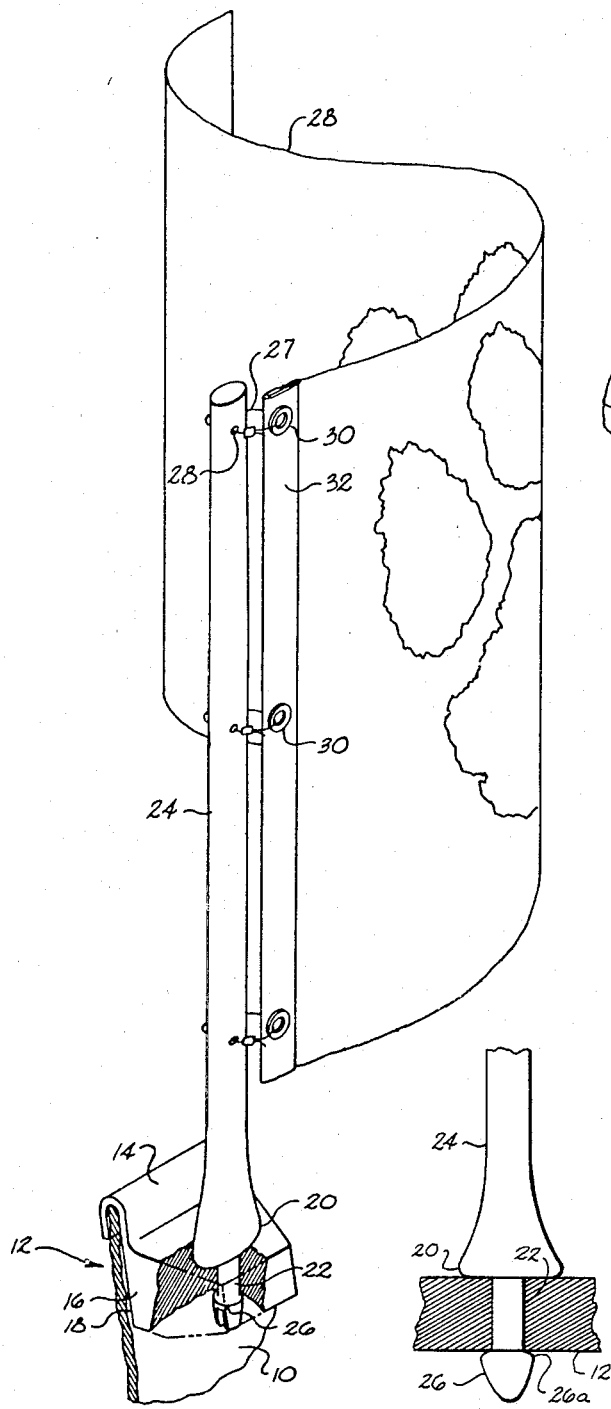
FIG. 2 is an enlarged perspective view with parts broken away of the flag display device, mounted in a bracket.
Figure 4:
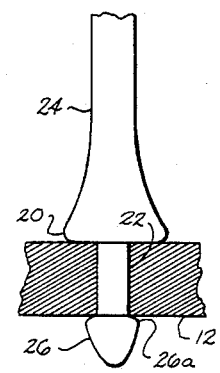
Figure 3:
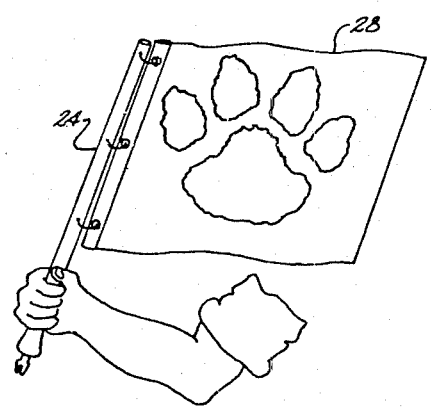
FIG. 3 is the same flag display device of FIG. 2 being held by hand.

Referring to FIG. 1 of the drawing, there is illustrated in section an automobile having a rear window 10 shown in a rolled up position. Positioned on the upper edge of the window 10 is a bracket 12 constructed in accordance with the present invention for holding a flag staff in an upright position.

The bracket 12 includes an inverted U-shaped portion 14 which rests on the upper edge of the window of the automobile and when the window 10 is raised, is pressed into the socket in which the window is normally received when in a closed position.

Extending outwardly is a main body portion 16 which has an inner wall 18 that presses against the flat surface of the window 10. A bore 20 extends through the main body portion 16 of the bracket at an angle of approximately twenty-two degrees to the inner wall 18.

The bore 20 is provided for receiving a reduced diameter lower portion 22 of a staff 24. It is noted that the lower portion 22 is bifurcated so as to provide a snug connection between the lower portion 22 of the staff and the inner wall of the bore when the staff is inserted therein. A slight protruding ridge 26 produces a locking engagement between the lower portion of the staff and the bottom of the bracket 16. A flag 28 constructed of any suitable material such as cloth is secured to the staff 24 by means of plastic connectors 27 which extend through holes 29 provided in the staff 24 and grommets 30 carried on the flag. Normally, a reinforcing strip 32 is provided on the flag so as to prevent tearing as the flag is exposed to wind speeds up to 60 and 70 miles per hour. There is a sufficient space between the lower edge of the flag and the bottom of the staff so as to permit the staff to be held by hand and waved after it is removed from the bracket.

While a preferred embodiment of the invention has been described using specific terms, such description is for illustrative purposes only, and it is to be understood that changes and variations may be made without departing from the spirit or scope of the following claims.

What is claimed is:

1. A display device for use on automobiles and the like comprising a bracket having a lower main body portion, a vertically extending bore provided in said main body portion, and an attachment means carried by said main body portion for securing said bracket to an automobile;

a removable staff having a lower portion extending into said bore and an upper vertically extending portion;

said lower portion including a bifurcated portion defined by a pair of resilient sides of said lower portion with a space therebetween which bias inwardly for insertion into and through said bore;

an enlarged ridge formed in said lower portion adjacent said bifurcated portion having a cross-section larger than the remainder of said lower portion for locking said lower portion in said bore allowing interlocking of said staff and bracket for highway use and repeated removal for hand-held use of said device;

a decorative flag;

retaining members extending between said decorative flag and said upper vertically extending portion of said staff securing said flag thereto whereby said flag is permitted to wave as said automobile is driven down a highway, and said staff can be readily removed from said bracket for being carried by hand and;

said enlarged ridge portion extending through said bore and interlocking with a bottom surface of said lower main body portion of said bracket.

2. The device as set forth above in claim 1 further comprising:

said attachment means including an inverted U-shaped member carried by said main body portion of said bracket adapted to fit over an upper edge of a window of an automobile for securing said bracket to said window while permitting said window to be raised to a closed position.

* * * * *